United States Patent
Kim et al.

(10) Patent No.: US 11,681,912 B2
(45) Date of Patent: Jun. 20, 2023

(54) NEURAL NETWORK TRAINING METHOD AND DEVICE

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Kyung-su Kim, Seoul (KR); Yukyung Choi, Daejeon (KR); Sung-jin Kim, Yongin-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 305 days.

(21) Appl. No.: 16/759,878

(22) PCT Filed: Nov. 16, 2017

(86) PCT No.: PCT/KR2017/013043
§ 371 (c)(1),
(2) Date: Apr. 28, 2020

(87) PCT Pub. No.: WO2019/098418
PCT Pub. Date: May 23, 2019

(65) Prior Publication Data
US 2021/0182664 A1    Jun. 17, 2021

(51) Int. Cl.
*G06N 3/08*    (2023.01)
*G06N 3/04*    (2023.01)
(Continued)

(52) U.S. Cl.
CPC ............. *G06N 3/08* (2013.01); *G06N 3/04* (2013.01); *G06T 1/00* (2013.01); *G06T 7/0006* (2013.01);
(Continued)

(58) Field of Classification Search
CPC .. G06N 3/08; G06N 3/04; G06K 9/00; G06V 20/00; G06T 2207/20081;
(Continued)

(56) References Cited

U.S. PATENT DOCUMENTS 7,711,662 B2    5/2010    Buscema
10,019,654 B1 *  7/2018    Pisoni ................. G06V 10/255
(Continued)

FOREIGN PATENT DOCUMENTS

KR    10-2007-0079211    8/2007
KR    10-2016-0131071    11/2016
(Continued)

OTHER PUBLICATIONS

International Search Report dated Aug. 14, 2018 in counterpart International Patent Application No. PCT/KR2017/013043 and English-language machine translation.
(Continued)

*Primary Examiner* — YuJang Tswei
(74) *Attorney, Agent, or Firm* — Nixon & Vanderhye, P.c.

(57) ABSTRACT

Provided are an AI system for simulating functions such as recognition, determination, and so forth of human brains by using a mechanical learning algorithm like deep learning, or the like, and an application thereof. In particular, according to the AI system and the application thereof, a neural network training method includes obtaining a plurality of first images belonging to a particular category and a plurality of second images for which a category is not specified, training a neural network model for category recognition,
(Continued)

based on the plurality of first images belonging to the particular category, recognizing at least one second image corresponding to the particular category among the plurality of second images, by using the trained neural network model, and modifying and refining the trained neural network model based on the recognized at least one second image.

7 Claims, 8 Drawing Sheets

(51) Int. Cl.
G06T 7/00 (2017.01)
G06T 7/55 (2017.01)
G06T 1/00 (2006.01)
G06V 20/00 (2022.01)

(52) U.S. Cl.
CPC ...... *G06T 7/55* (2017.01); *G06T 2207/20081* (2013.01); *G06T 2207/20084* (2013.01); *G06V 20/00* (2022.01)

(58) Field of Classification Search
CPC ......... G06T 2207/20084; G06T 7/0006; G06T 7/55; G06T 1/00
See application file for complete search history.

(56) References Cited

U.S. PATENT DOCUMENTS

| | | | | |
|---|---|---|---|---|
| 2005/0100209 A1* | 5/2005 | Lewis | ................ | G06K 9/6262 382/224 |
| 2010/0211536 A1* | 8/2010 | Al-Fattah | ................ | E21B 49/00 706/21 |
| 2010/0217589 A1 | 8/2010 | Gruhn et al. | | |
| 2015/0294219 A1 | 10/2015 | Krizhevsky | | |
| 2016/0012330 A1 | 1/2016 | Pescianschi | | |
| 2016/0110642 A1* | 4/2016 | Matsuda | ............. | G06N 3/0454 706/25 |
| 2016/0117587 A1* | 4/2016 | Yan | ...................... | G06N 3/0454 706/20 |
| 2016/0358099 A1 | 12/2016 | Sturlaugson et al. | | |
| 2017/0161633 A1* | 6/2017 | Clinchant | ................ | G06N 5/02 |
| 2018/0005079 A1* | 1/2018 | Tosic | ..................... | G06V 10/82 |
| 2018/0012460 A1* | 1/2018 | Heitz, III | ......... | G08B 13/19682 |
| 2018/0039406 A1* | 2/2018 | Kong | ...................... | G06F 9/451 |
| 2018/0144465 A1* | 5/2018 | Hsieh | ....................... | G06N 3/08 |
| 2018/0217808 A1* | 8/2018 | Baughman | .......... | G06V 40/174 |
| 2018/0374105 A1* | 12/2018 | Azout | ..................... | G06N 3/08 |
| 2019/0095946 A1* | 3/2019 | Azout | .................. | G06N 3/0454 |
| 2019/0122073 A1* | 4/2019 | Ozdemir | ............. | A61B 5/7267 |
| 2019/0138850 A1* | 5/2019 | Sigal | ..................... | G06N 3/084 |
| 2019/0155973 A1* | 5/2019 | Morczinek | ............... | G06N 3/08 |

FOREIGN PATENT DOCUMENTS

| | | |
|---|---|---|
| KR | 10-2016-0143512 | 12/2016 |
| KR | 10-2016-0144467 | 12/2016 |

OTHER PUBLICATIONS

Written Opinion dated Aug. 14, 2018 in counterpart International Patent Application No. PCT/KR2017/013043 and English-language machine translation.

Office Action dated Jan. 31, 2023 in counterpart Korean Patent Application No. 10-2020-7013184 and English-language machine translation.

Lin, Liang et al., "Active Self-Paced Learning for Cost-Effective and Progressive Face Identification," arXiv:1701.03555v2 [cs CV] Jul. 3, 2017, pp. 1-15.

* cited by examiner

NEURAL NETWORK TRAINING METHOD AND DEVICE

This application is the U.S. national phase of International Application No. PCT/KR2017/013043 filed 16 Nov. 2017, which designated the U.S., the entire contents of which is hereby incorporated by reference.

FIELD

Disclosed embodiments relate to a neural network training method, a neural network training device, and a recording medium having recorded thereon a program for executing the neural network training method.

DESCRIPTION OF RELATED ART

An artificial intelligence (AI) system is a computer system that implements human-level intelligence, and allows a machine to self-train, make decisions, and become smarter, unlike an existing rule-based smart system. The more an AI system is used, the greater its recognition rate and the more accurately a user's preferences may be understood. Thus, existing rule-based smart systems have been gradually replaced with deep-learning-based AI systems.

AI technology includes machine learning (e.g., deep learning) and element technologies using machine learning.

Machine learning refers to an algorithm technology in which a machine classifies and learns characteristics of input data autonomously. Element technologies refer to technologies using a machine learning algorithm, such as deep learning, and may be divided into fields of linguistic understanding, visual understanding, reasoning/prediction, knowledge representation, operation control, etc.

AI technology is employed in various fields. For example, linguistic understanding refers to technology for recognizing, applying, and processing verbal/written language of a human and includes natural language processing, machine translation, a conversation system, question and answer, and voice recognition/synthesis. Visual understanding refers to technology for recognizing and processing objects as in human vision and includes object recognition, object tracking, image search, human recognition, scene understanding, spatial understanding, image improvement, etc. Reasoning/prediction refers to technology for determining information and executing logical reasoning and prediction and includes knowledge/probability-based reasoning, optimization prediction, preference-based planning, recommendation, etc. Knowledge representation refers to technology for automated processing of human experience information into knowledge data and includes knowledge construction (generating/classifying data), knowledge management (utilizing data), etc. Operation control refers to technology for controlling automated driving of a vehicle and motion of a robot and includes motion control (navigation, collision avoidance, driving), manipulation control (behavior control), etc.

SUMMARY

Disclosed embodiments provide a neural network training method and device which use a neural network model trained based on a category-specified partial data set to recognize a category of the other data set and use a recognition result to train the neural network model, thus training the neural network with a small-amount data set.

Provided are an AI system for simulating functions such as recognition, determination, and so forth of human brains by using a mechanical learning algorithm like deep learning, or the like, and an application thereof. In particular, according to the AI system and the application thereof, the disclosure obtains a plurality of first images belonging to a particular category and a plurality of second images for which a category is not specified, trains a neural network model for category recognition, based on the plurality of first images belonging to the particular category, recognizes at least one second image corresponding to the particular category among the plurality of second images, by using the trained neural network model, and modifies and refines the trained neural network model based on the recognized at least one second image.

DETAILED DESCRIPTION

Figure 1:
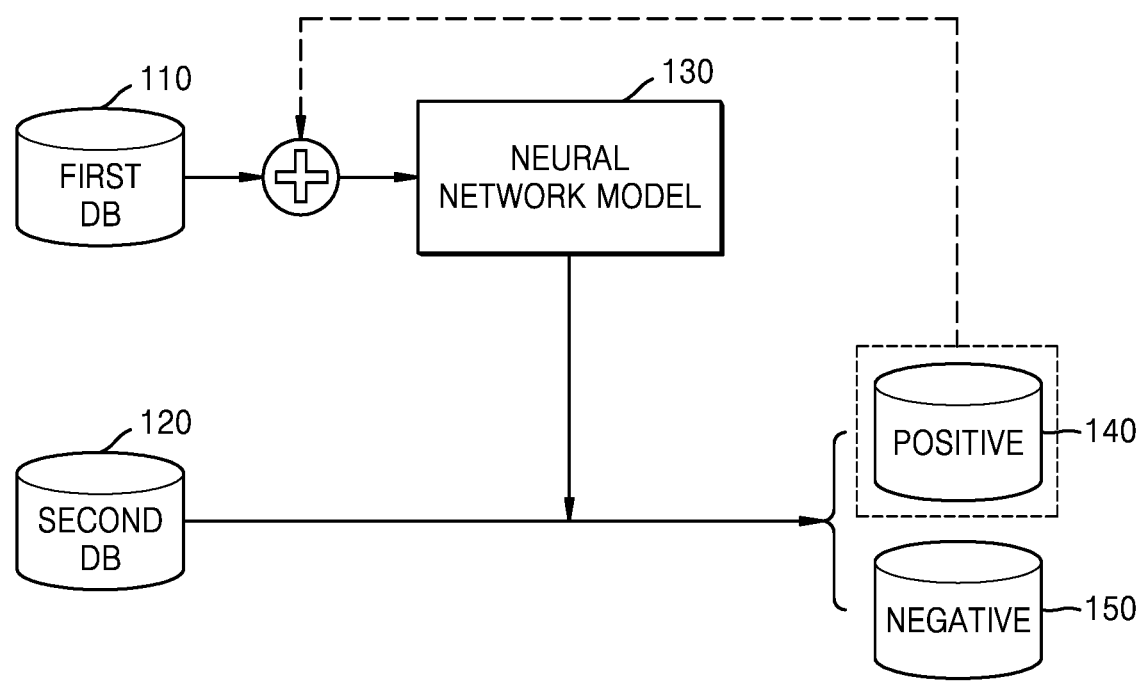
FIG. 1 is a conceptual diagram for describing a neural network training method, according to an embodiment of the disclosure.

A neural network training method according to an embodiment of the disclosure includes obtaining a plurality of first images belonging to a particular category and a plurality of second images for which a category is not specified, training a neural network model for category recognition, based on the plurality of first images belonging to the particular category, recognizing at least one second image corresponding to the particular category among the plurality of second images, by using the trained neural network model, and modifying and refining the trained neural network model based on the recognized at least one second image.

The neural network training method according to an embodiment of the disclosure may further include recognizing a category of a second image except for the at least one second image recognized as corresponding to the particular category among the plurality of second images, by using the modified and refined neural network model.

The neural network training method according to an embodiment of the disclosure may further include comparing the at least one second image recognized corresponding to the particular category with an image stored in a previously-generated verification database (DB) to verify a recognition result.

In the neural network training method according to an embodiment of the disclosure, the recognizing of the at least one second image may include recognizing the at least one second image by applying information about a user-preferred image as a weight value to a recognition result of the neural network model.

In the neural network training method according to an embodiment of the disclosure, the recognizing of the at least one second image may include receiving a user input to verify a recognition result of the neural network model and recognizing the at least one second image based on the recognition result of the neural network model and the received user input.

A neural network training device include a memory storing one or more instructions and at least one processor configured to execute the one or more instructions stored in the memory, in which the at least one processor is further configured to obtain a plurality of first images belonging to a particular category and a plurality of second images for which a category is not specified, to train a neural network model for category recognition, based on the plurality of first images belonging to the particular category, to recognize at least one second image corresponding to the particular category among the plurality of second images, by using the trained neural network model, and to modify and refine the trained neural network model based on the recognized at least one second image.

MODE OF DISCLOSURE

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Although ordinal numbers such as "first", "second", and so forth will be used to describe various components, those components are not limited by the terms. These terms may be used for the purpose of distinguishing one element from another element. For example, a first element may be named as a second element without departing from the right scope of the various exemplary embodiments of the disclosure, and similarly, a second element may be named as a first element. The term "and/or" includes a combination of a plurality of related items or any one of the plurality of related items.

Throughout the entirety of the specification of the disclosure, if it is assumed that a certain part includes a certain component, the term 'including' means that a corresponding component may further include other components unless a specific meaning opposed to the corresponding component is written. In exemplary embodiments of the disclosure, the term "unit", as used herein, denotes a software or hardware component, such as a Field Programmable Gate Array (FPGA) or Application Specific Integrated Circuit (ASIC), which performs certain tasks. However, the meaning of "unit" is not limited to software or hardware. "Unit" may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units".

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

FIG. 1 is a conceptual diagram for describing a neural network training method, according to an embodiment of the disclosure.

Referring to FIG. 1, a neural network training device (hereinafter, a device) may obtain a plurality of first and second images 110 and 120 for training a recognition model based on a neural network to recognize a category of an object. Meanwhile, a category indicates a type of an object included in an image, and various categories may exist according to classification. For example, numbers 0, 1, 2, 3, 4, 5, etc., may be respective categories, and species of animals such as a dog, a cat, etc., may be respective categories. According to another example, types of things such as a chair, a desk, a blackboard, etc., may be respective categories.

The device according to an embodiment of the disclosure may train a neural network model 130 based on the plurality of first images 110 belonging to a particular category. For example, the device may train the neural network model 130 based on a plurality of images determined to belong to a category 'chair'.

Upon completion of training, the device may input the plurality of second images 120 for which a category is not specified, to the neural network model 130. In this case, because the neural network model 130 has not yet been trained based on a large amount of images, a recognition rate may be low. For example, about 10% of a chair image included in the plurality of second images 120 for which the category is not specified may be recognized by the neural network model 130.

The device according to an embodiment of the disclosure may train the neural network model 130 by using at least one second image 140 classified as corresponding to a particular category (as 'positive'). By re-using a recognition result for training, the device may secure an additional image required for training, thus correspondingly improving performance of the neural network model 130.

When training of the neural network model 130 is completed based on the at least one second image 140 classified as corresponding to a particular category, the device may input the other second images 150, which are not classified as corresponding to a particular category, to the neural network model 130. The device may use a recognition result to re-train the neural network model 130, as mentioned above.

By re-using the recognition result for training, the device may reduce a load of a large amount of data required for initial training the neural network model 130 and gradually improve the performance of the neural network model 130.

Figure 2:
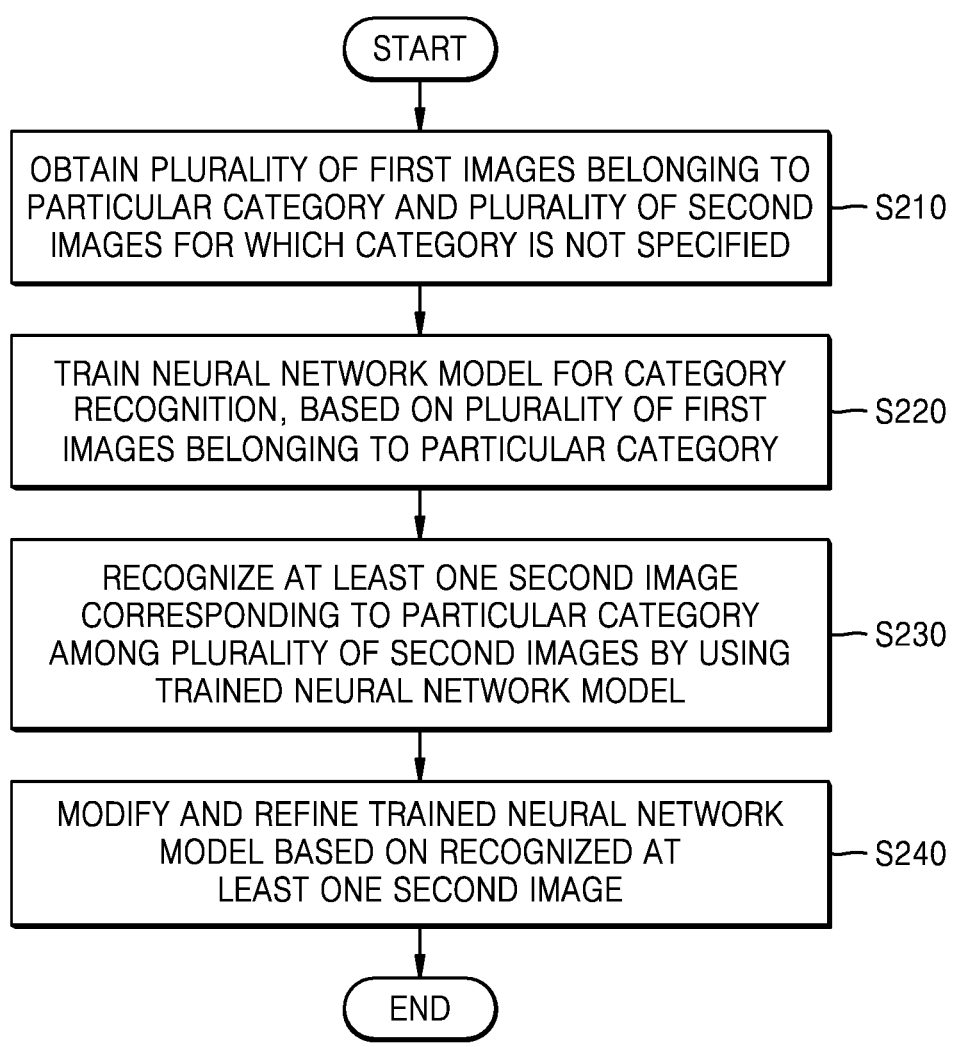
FIG. 2 is a flowchart illustrating a method, performed by a device, of training a neural network, according to an embodiment of the disclosure.

FIG. 2 is a flowchart illustrating a method, performed by a device, of training a neural network, according to an embodiment of the disclosure.

In operation S210, the device may obtain a plurality of first images belonging to a particular category and a plurality of second images for which a category is not specified.

The device according to an embodiment of the disclosure may obtain the plurality of first images that are category-specified from a training database (DB) of an external server or a memory in the device. The device may obtain the plurality of images crawled at random from a web server, etc.

In operation S220, the device may train the neural network model for category recognition, based on the plurality of first images belonging to the particular category.

The device according to an embodiment of the disclosure may train a criterion of the neural network model for extracting attribute information used to recognize the particular category, based on the plurality of category-specified first images.

Herein, the attribute information may include a color, an edge, a polygon, a saturation, a brightness, a color temperature, blur, sharpness, contrast, etc., constituting a query image, but these are merely examples, and the attribute information is not limited thereto.

The device may also verify a training result of the neural network model based on an image stored in a separate verification DB.

In operation S230, the device may recognize at least one second image corresponding to the particular category among the plurality of second images by using the trained neural network model.

The device may input the plurality of second images for which a category is not specified, to the neural network model. Considering that the number of images used to train the neural network model is insufficient, a threshold that is a criterion for recognizing a particular category may be set relatively high. The threshold may be determined as a value for recognizing a second image corresponding to a particular category through experiment.

In operation S240, the device may modify and refine the trained neural network model based on the recognized at least one second image.

The device according to an embodiment of the disclosure may use at least one second image classified as belonging to the same category as the plurality of first images. The at least one second image is input as new training data to the neural network model, such that a parameter that is a criterion for extracting the attribute information for category recognition may be modified and refined in the neural network model.

The device may input the other second image than the at least one second image recognized as corresponding to the particular category among the plurality of second images to the modified and refined neural network model.

As described above, the device may gradually improve performance of the neural network model by repeatedly using the recognition result to train the neural network model.

Figure 3:
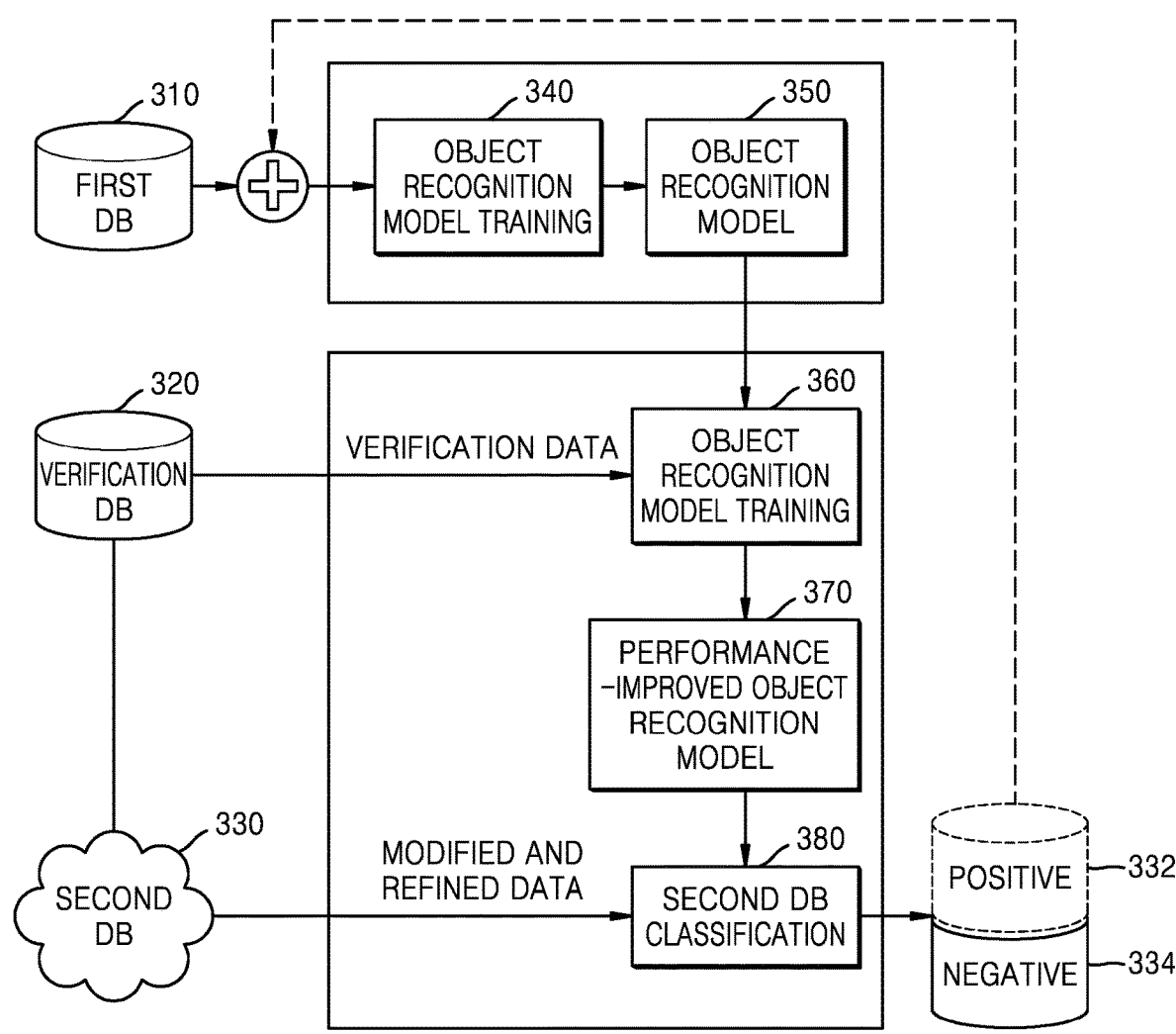
FIG. 3 is a diagram for describing a method, performed by a device, of gradually training a neural network model based on a category-specified partial image, according to an embodiment of the disclosure.

FIG. 3 is a diagram for describing a method, performed by a device, of gradually training a neural network model based on a category-specified partial image, according to an embodiment of the disclosure.

Referring to FIG. 3, the device may obtain a plurality of first images 310 belonging to a particular category and a plurality of second images 330 for which a category is not specified. For example, the device may obtain the plurality of first images classified as a chair category. The device may obtain the plurality of category-unspecified second images 330 at random from the web server, etc.

The device may obtain an object recognition model 350 that is a neural network model for object recognition through object recognition model training 340. To improve the performance of the object recognition model 350, the device may verify the generated object recognition model 350 based on verification data obtained from the verification DB 320, thus obtaining a performance-improved object recognition model 370. For example, the device may recognize an image included in the verification DB through the object recognition model 350, thus improving the performance of the object recognition model 350. Herein, the verification DB 320 may be stored in the device or may be stored in an external server such as a web server, a social networking service (SNS) server, etc.

The device according to an embodiment of the disclosure may perform classification 380 of the plurality of second images by inputting the plurality of category-unspecified second images to the performance-improved object recognition model 370. As a result, the device may recognize at least one second image 332 corresponding to the same category as the first image among the plurality of second images.

The device may modify and refine the object recognition model 350 based on the recognized at least one second image 332. The device may also recognize a category of a second image 334 that is not classified as belonging to a particular category based on the modified and refined object recognition model.

Figure 4:
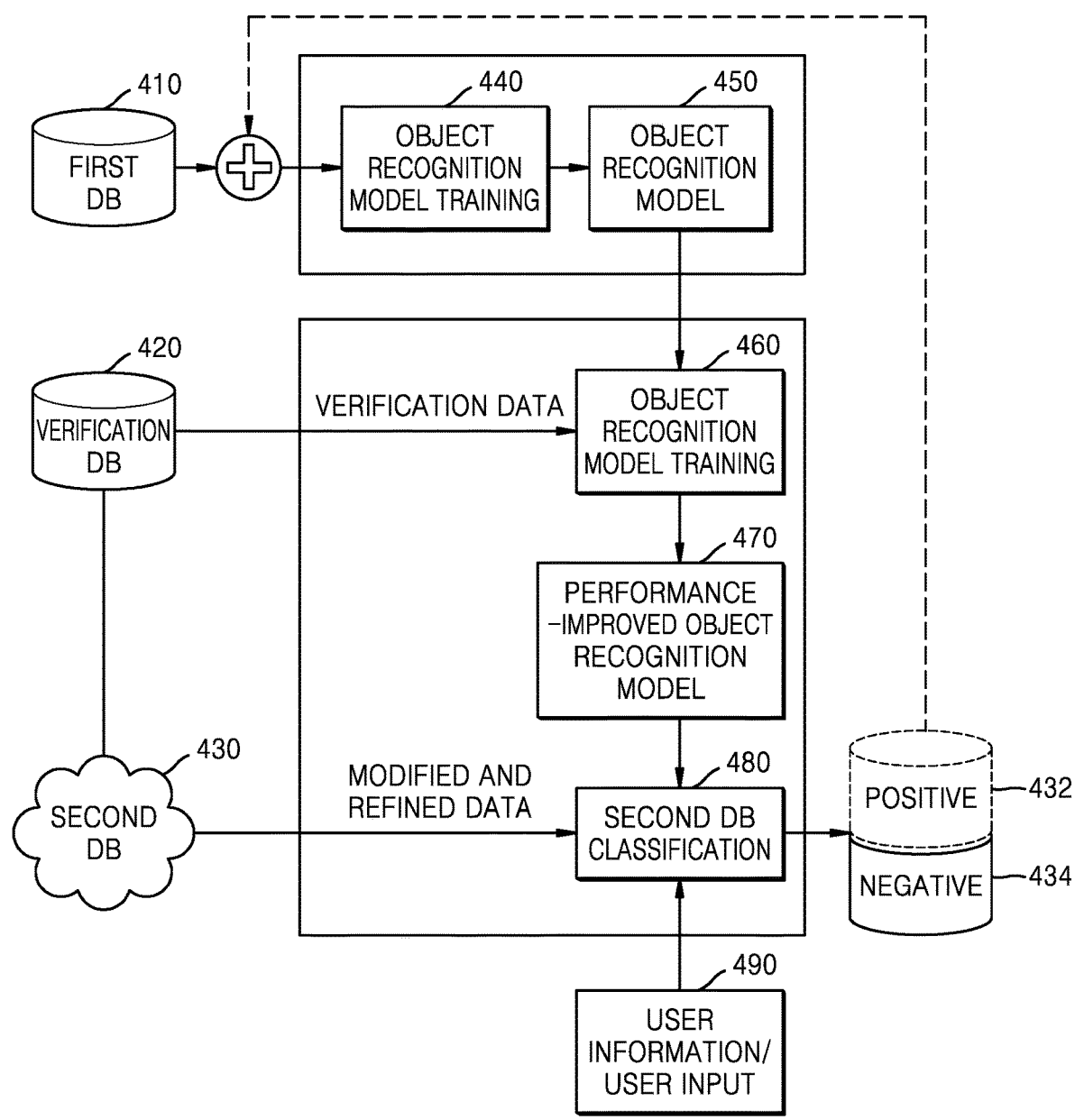
FIG. 4 is a diagram for describing a method, performed by a device, of training a neural network by further using user information or a user input, according to an embodiment of the disclosure.

FIG. 4 is a diagram for describing a method, performed by a device, of training a neural network by further using user information or a user input, according to an embodiment of the disclosure.

Referring to FIG. 4, the device may obtain a plurality of first images 410 belonging to a particular category and a plurality of second images 430 for which a category is not specified. Herein, the plurality of first images 410 and the plurality of second images 430 may correspond to the plurality of first images 310 and the plurality of second images 330 described above with reference to FIG. 3.

The device may obtain an object recognition model 450 that is a neural network model for object recognition through object recognition model training 440. To improve the performance of the object recognition model 450, the device may verify the generated object recognition model 450 based on verification data obtained from the verification DB 420, thus obtaining a performance-improved object recognition model 470.

The device according to an embodiment of the disclosure may perform classification 480 of the plurality of second images by inputting the plurality of category-unspecified second images to the performance-improved object recognition model 470.

Meanwhile, as the neural network model is trained merely with the plurality of category-specified first images, the accuracy of a classification result of the neural network model may be improved by using additional information as well as the classification result of the neural network model. According to an embodiment, the device may additionally use at least one 490 of user information or a user input for classification of the neural network model. Herein, the user information may include user preference information, etc.

Generally, the user may view an image including a user-preferred type of an object more frequently. For example, for a user who likes a dog, in an image obtained by the device, a probability of an image including the dog existing may be high. Thus, the device may perform category recognition with respect to a second image for which it is not clear whether the second image belongs to the same category as the plurality of first images as a classification result with respect to the plurality of second images, based on user preference. For example, when a probability of a category of an object included in a predetermined second image being a dog is determined as 0.5, the device may recognize the category of the predetermined second image as a dog for high user preference of the dog. However, this is merely an example, and the neural network training method using the user preference information is not limited to the example.

According to another embodiment, the device may use the user input to recognize a category of the plurality of second images. For example, the device may perform category recognition with respect to a second image for which it is not clear whether the second image belongs to the same category as the plurality of first images as a classification result with respect to the plurality of second images, based on a user input. The device may display a query or message for selecting the category of the predetermined second image to request the user input. When the device receives the user input indicating that the predetermined second image belongs to the same category as the first image from the user, the device may determine the category of the predetermined second image based on the user input.

The device may modify and refine the object recognition model 350 based on the recognized at least one second image 432. The device may also recognize a category of a second image 434 that is not classified as belonging to a particular category based on the modified and refined object recognition model.

Figure 5:
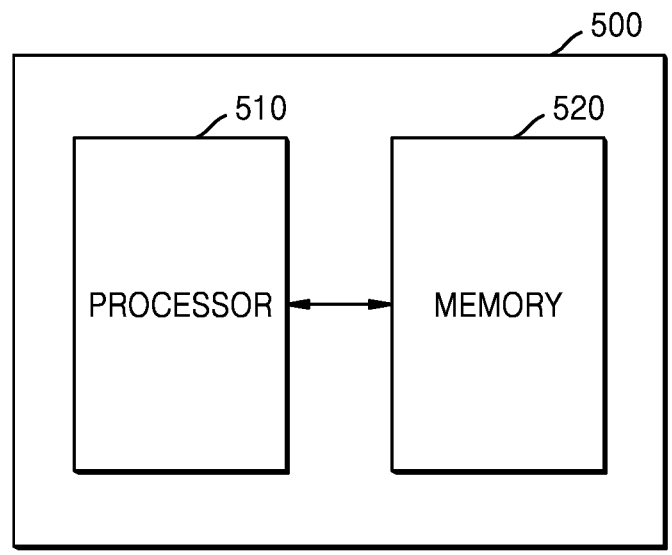
FIGS. 5 and 6 are block diagrams of a neural network training device for class recognition, according to an embodiment of the disclosure.
Figure 6:
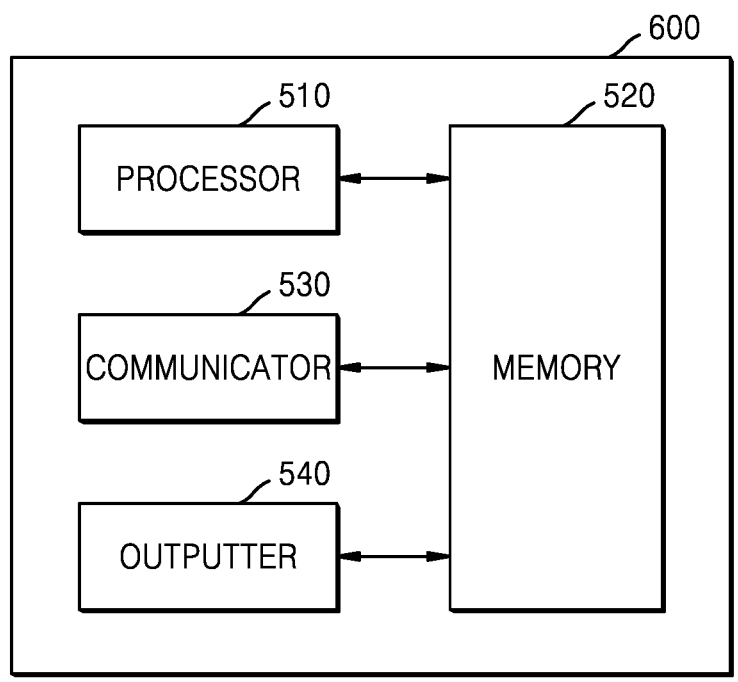

FIGS. 5 and 6 are block diagrams of a neural network training device 500 for class recognition, according to an embodiment of the disclosure.

Referring to FIG. 5, the neural network training device (hereinafter, the device) 500 may include a processor 510 and a memory 520. However, this is merely an example, and the device 500 may include components that are more or less than the processor 510 and the memory 520. For example, referring to FIG. 6, a device 600 according to another embodiment of the disclosure may further include a communicator 520 and an outputter 540 in addition to the processor 510 and the memory 520. In another example, the device 500 may also include a plurality of processors.

The processor 510 may include one or more cores (not shown), a graphic processor (not shown), and/or a connection path (e.g., a bus, etc.) for transmitting and receiving signals to and from other components.

The processor 510 may include one or more cores (not shown), a graphic processor (not shown), and/or a connection path (e.g., a bus, etc.) for transmitting and receiving signals to and from other components.

According to an embodiment, the processor 510 may perform the above-described operations of the device with reference to FIGS. 1 through 4.

For example, the processor 510 may obtain a plurality of first images belonging to a particular category and a plurality of second images for which a category is not specified. The processor 510 may train the neural network model for category recognition, based on the plurality of first images belonging to the particular category.

The processor 510 may recognize at least one second image corresponding to a particular category among the plurality of second images by using the trained neural network model. The processor 510 may modify and refine the trained neural network model based on the recognized at least one second image.

The processor 510 may recognize a category of the other second image than the at least one second image recognized as corresponding to the particular category among the plurality of second images, by using the modified and refined neural network model.

According to an embodiment, the processor 510 may compare the at least one second image recognized as corresponding to the particular category with an image stored in the generated verification DB to verify the recognition result.

The processor 510 according to an embodiment of the disclosure may recognize the at least one second image by applying information about a user-preferred image as a weight value to the recognition result of the neural network model. According to another embodiment, the processor 510 may receive a user input to verify the recognition result of the neural network model, and recognize the at least one second image based on the recognition result of the neural network model and the received user input.

Meanwhile, the processor 510 may further include a random access memory (RAM, not shown) and a read-only memory (RAM, not shown) that temporarily and/or permanently store a signal (or data) processed in the processor 510. The processor 510 may be implemented in the form of a system on chip (SoC) including at least one of the graphic processor, the RAM, or the ROM.

The memory 520 may store programs (one or more instructions) for processing and controlling the processor 510. The programs stored in the memory 520 may be classified into a plurality of modules according to functions thereof. According to an embodiment, the memory 520 may include a data learner and a data recognizer to be described below with reference to FIG. 7 as a software module. The data learner and the data recognizer may independently include trained network models, respectively, or may share one trained network model.

The communicator 530 may include one or more elements that enable communication with an external server and other external devices. For example, the communicator 530 may receive at least one image from a web server, an SNS server, etc.

The outputter 540 may output information processed by the device 500. For example, the outputter 540 may output category information of the second image, which is obtained as a result of classifying the plurality of second images by using the neural network model.

The device 500 may be, for example, a personal computer (PC), a laptop, a cellular phone, a micro server, a global positioning system (GPS) device, a smart phone, a wearable terminal, an electronic book terminal, a home appliance, an electronic device in a vehicle, and other mobile or non-mobile computing devices. However, the device 500 may include any type of devices including a data processing function, without being limited thereto.

Figure 7:
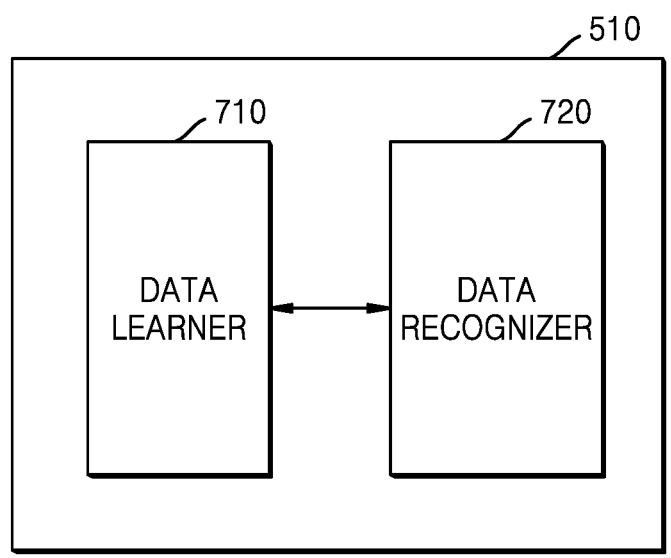
FIG. 7 is a block diagram for describing a processor according to an embodiment of the disclosure.

FIG. 7 is a diagram for describing the processor 510 according to an embodiment of the disclosure.

Referring to FIG. 7, the processor 510 according to an embodiment of the disclosure may include a data learner 710 and a data recognizer 720.

The data learner 710 may learn a criterion for obtaining attribute information required for recognizing a category of an object from an image. For example, the data learner 710 may learn a criterion for obtaining attribute information from the plurality of first images or the at least one second image for which the category is recognized. Herein, according to the trained criterion, a weight value of at least one layer included in the data learner 710 may be determined.

The data recognizer 720 may extract attribute information of each of the plurality of images based on the criterion trained through the data learner 710 or recognize a category of an object included in each of the plurality of images.

At least one of the data learner 710 or the data recognizer 720 may be manufactured in the form of at least one hardware chip and mounted on the neural network training device. For example, at least one of the data learner 710 or the data recognizer 720 may be manufactured in the form of a dedicated hardware chip for artificial intelligence (AI), or may be manufactured as a part of an existing general-purpose processor (e.g., a central processing unit (CPU), or an application processor) or a dedicated graphic processor (e.g., a graphic processing unit (GPU)) and mounted on various neural network training devices.

In this case, the data learner 710 and the data recognizer 720 may be mounted on one neural network training device or on separate neural network training devices. For example, one of the data learner 710 and the data recognizer 720 may be included in one device, and the other may be included in a server. The data learner 710 and the data recognizer 720 may be connected in a wired or wireless manner, such that model information established by the data learner 710 may be provided to the data recognizer 720 or data input to the data recognizer 720 may be provided to the data learner 710 as additional training data.

Meanwhile, at least one of the data learner 710 or the data recognizer 720 may be implemented with a software module. When at least one of the data learner 710 and the data recognizer 720 may be implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 8:
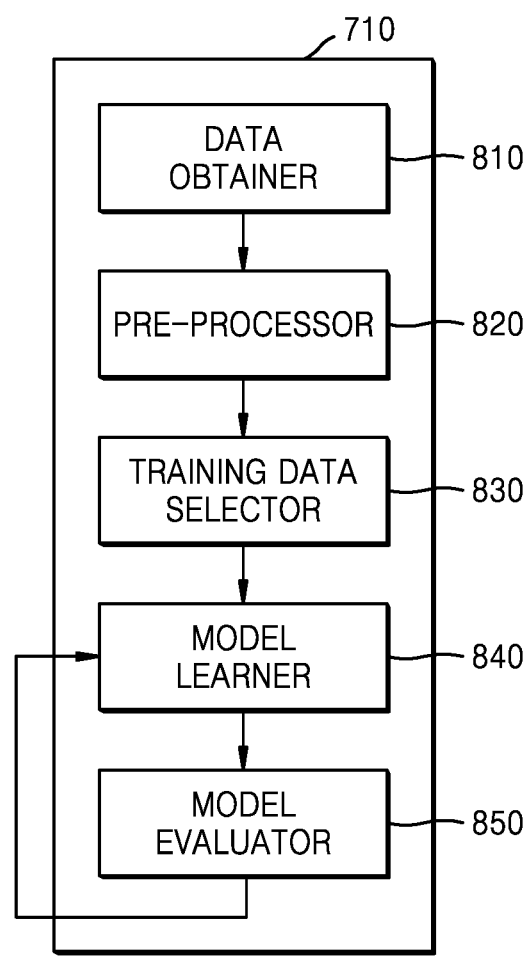
FIG. 8 is a block diagram of a data learner according to an embodiment of the disclosure.

FIG. 8 is a block diagram of the data learner 710 according to an embodiment of the disclosure.

Referring to FIG. 8, the data learner 710 according to some embodiments of the disclosure may include a data obtainer 810, a pre-processor 820, a training data selector 830, a model learner 840, and a model evaluator 850. However, this is merely an example, and the data learner 710 may include less components than the above-described components, or other components in addition to the above-described components may be further included in the data learner 710.

The data obtainer 810 may obtain a plurality of first images belonging to a particular category as training data. For example, the data obtainer 810 may obtain at least one image from the neural network training device or an external device or a server capable of communicating with including the data learner 710.

The data obtainer 810 may obtain the plurality of second images for which a category is not specified. The plurality of second images may be applied as an input to the neural network model trained based on the plurality of first images described above.

The data obtainer 810 may additionally obtain a verifying image used to verify the neural network model trained based on the plurality of first images.

The pre-processor 820 may pre-process the obtained data, such that the obtained image may be used for training to extract the attribute information of the image or recognize the category of the object in the image. The pre-processor 820 may process the obtained at least one image into a preset format, such that the model learner 840 may use the at least one image obtained for training.

The training data selector 830 may select an image required for training from pre-processed data. The selected image may be provided to the model learner 840. The training data selector 830 may select an image required for training from pre-processed data, according to a preset criterion.

The model learner 840 may obtain attribute information by using information from an image in a plurality of layers in a trained network model or learn a criterion for recognizing an object in an image.

According to various embodiments of the disclosure, when there are a plurality of neural network models established in advance, the model learner 840 may determine a neural network model having a high correlation between input training data and basic training data as a neural network model to be trained. In this case, the basic training data may be classified in advance according to a data type, and the neural network model may be established in advance for each data type. For example, the basic training data may be classified depending on various criteria such as a region where training data is generated, a time in which training data is generated, a size of training data, a genre of training data, a generator of training data, a type of an object in training data, and so forth.

The model learner 840 may train a data generation model through reinforcement learning based on a feedback regarding whether a category recognized by training is correct or not.

Once the model learner 840 trains the data generation model, the model learner 840 may store the trained data generation model. In this case, the model learner 840 may store the trained data generation model in the memory of the neural network training device including the data obtainer 810. Alternatively, the model learner 840 may store the trained data generation model in a memory of a server connected with the neural network training device via a wired or wireless network.

In this case, the memory in which the trained data generation model is stored may also store an instruction or data related to at least one other element of the neural network training device. The memory may also store software and/or programs. The program may include a kernel, middleware, an application programming interface (API), and/or an application program (or "application"), and the like.

When a generation result of additional training data output from evaluation data after input of the evaluation data to the data generation model fails to satisfy a criterion, the model evaluator 850 may cause the model learner 840 to learn again. In this case, the evaluation data may be preset data for evaluating the data generation model. Herein, the evaluation data may include a difference between a category of an object recognized based on the training network model and a category of a real object.

Meanwhile, when there are a plurality of trained network models, the model evaluator 750 may evaluate whether each trained network model satisfies a predetermined criterion, and determine a trained network model satisfying the predetermined criterion as a final trained network model.

At least one of the data obtainer 810, the pre-processor 820, the training data selector 830, the model learner 840, or the model evaluator 850 in the data learner 710 may be manufactured in the form of at least one hardware chip and mounted on the neural network training device. For example, at least one of the data obtainer 810, the pre-processor 820, the training data selector 830, the model learner 840, and the model evaluator 850 may be manufactured in the form of a dedicated hardware chip for AI, or may be manufactured as a part of an existing general-purpose processor (e.g., a CPU or an application processor) or a dedicated graphic processor (e.g., a GPU) and mounted on various neural network training devices.

The data obtainer 810, the pre-processor 820, the training data selector 830, the model learner 840, and the model evaluator 850 may be mounted on one neural network training device or on separate neural network training devices, respectively. For example, some of the data obtainer 810, the pre-processor 820, the training data selector 830, the model learner 840, and the model evaluator 850 may be included in the neural network training device, and some others thereof may be included in a server.

At least one of the data obtainer 810, the pre-processor 820, the training data selector 830, the model learner 840, or the model evaluator 850 may be implemented with a software module. When at least one of the data obtainer 810, the pre-processor 820, the training data selector 830, the model learner 840, and the model evaluator 850 is implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Figure 9:
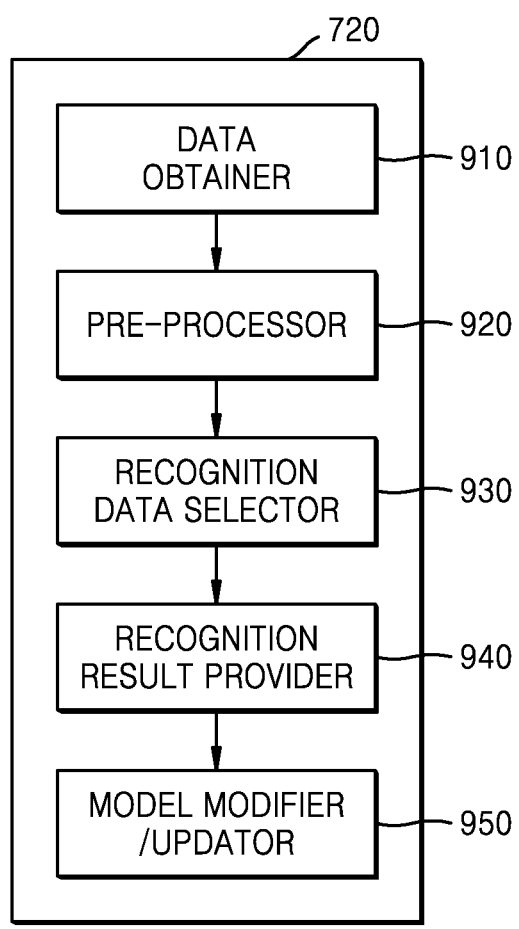
FIG. 9 is a block diagram of a data recognizer according to an embodiment of the disclosure.

FIG. 9 is a block diagram of the data recognizer 720 according to an embodiment of the disclosure.

Referring to FIG. 9, the data recognizer 720 according to some embodiments of the disclosure may include a data obtainer 910, a pre-processor 920, a recognition data selector 930, a recognition result provider 940, and a model modifier/refiner 950.

The data obtainer 910 may obtain at least one image required for extracting attribute information of an image or recognizing an object in the image, and the pre-processor 920 may pre-process the obtained image such that the at least one image obtained for extracting the attribute information of the image or recognizing the object in the image may be used. The pre-processor 920 may process the obtained image into a preset format, such that a recognition result provider 940 to be described later may use the image obtained for extracting the attribute information of the image or recognizing the category of the object in the image. The recognition data selector 930 may select an image required for attribute extraction or category recognition from the pre-processed data. The selected data may be provided to the recognition result provider 940.

The recognition result provider 940 may apply the selected image to the trained network model according to an embodiment of the disclosure to extract the attribute information of the image or recognize the object in the image. A method of extracting the attribute information or recognizing the object by inputting at least one image to the trained network model may correspond to a method described above with reference to FIGS. 1 through 4.

The recognition result provider 940 may provide a result of recognizing the category of the object included in the at least one image.

The model modifier/refiner 950 may provide information about evaluation to the model learner 840 described with reference to FIG. 8 to modify or refine a species classification network included in the trained network model or a parameter of at least one feature extraction layer based on evaluation with respect to the result of recognizing the category of the object included in the image, the result being provided by the recognition result provider 940.

At least one of the data obtainer 910, the pre-processor 920, the recognition data selector 930, the recognition result provider 940, or the model modifier/refiner 950 in the data recognizer 720 may be manufactured in the form of at least one hardware chip and mounted on the neural network training device. For example, at least one of the data obtainer 910, the pre-processor 920, the recognition data selector 930, the recognition result provider 940, or the model modifier/refiner 950 may be manufactured in the form of a dedicated hardware chip for AI, or may be manufactured as a part of an existing general-purpose processor (e.g., a CPU or an application processor) or a dedicated graphic processor (e.g., a GPU) and mounted on various neural network training devices.

The data obtainer 910, the pre-processor 920, the recognition data selector 930, the recognition result provider 940, and the model modifier/refiner 950 may be mounted on one neural network training device or on separate neural network training devices, respectively. For example, some of the data obtainer 910, the pre-processor 920, the recognition data selector 930, the recognition result provider 940, and the model modifier/refiner 950 may be included in the neural network training device, and some others thereof may be included in a server.

At least one of the data obtainer 910, the pre-processor 920, the recognition data selector 930, the recognition result provider 940, or the model modifier/refiner 950 may be implemented as a software module. When at least one of the data obtainer 910, the pre-processor 920, the recognition data selector 930, the recognition result provider 940, or the model modifier/refiner 950 is implemented with a software module (or a program module including an instruction), the software module may be stored in a non-transitory computer-readable medium. In this case, at least one software module is provided by an OS or by an application. Alternatively, a part of the at least one software module may be provided by an OS and another part thereof may be provided by an application.

Meanwhile, the foregoing some embodiments of the disclosure may be written as programs executable on computers, and may be implemented on general-purpose digital computers operating the programs by using computer-readable recording medium.

The computer-readable recording medium may include storage medium such as magnetic storage medium (e.g., read only memory (ROM), floppy disks, hard disks, etc.), optical recording medium (e.g., compact disk (CD)-ROMs, digital versatile disks (DVDs), etc.), and carrier waves (e.g., transmission over the Internet).

While embodiments of the disclosure have been described with reference to the attached drawings, those of ordinary skill in the art to which the disclosure pertains will appreciate that the disclosure may be implemented in different detailed forms without departing from the technical spirit or essential characteristics of the disclosure. Accordingly, the aforementioned embodiments of the disclosure should be construed as being only illustrative, but should not be constructed as being restrictive from all aspects.

What is claimed is:

1. A neural network training method comprising:
Obtaining a plurality of first images and a plurality of second images, wherein each of the plurality of first images includes an object belonging to one of a plurality of categories and each of the plurality of second images includes an object for which a category is not specified;
training a neural network model for category recognition, based on the plurality of first images;
identifying probability that the object included in one of the plurality of second images belongs to a first category among the plurality of categories, using the trained neural network model;
in a case that the probability is identified as 0.5, recognizing a category of the object as a second category preferred by a user, based on user preference information; and
modifying and refining the trained neural network model based on the recognized category of the object.

2. The neural network training method of claim 1, further comprising recognizing a category of an object included in a second image except for the one of the plurality of second images, using the modified and refined neural network model.

3. The neural network training method of claim 1, further comprising comparing the one of the plurality of second images with an image stored in a previously-generated verification database (DB) to verify a recognition result.

4. A neural network training device comprising:
a memory storing one or more instructions; and
at least one processor configured to execute the one or more instructions stored in the memory,
wherein the at least one processor is further configured to:
obtain a plurality of first images and a plurality of second images, wherein each of the plurality of first images includes an object belonging to one of a plurality of categories and each of the plurality of second images includes an object for which a category is not specified;
train a neural network model for category recognition, based on the plurality of first images;
identify probability that the object included in one of the plurality of second images belongs to a first category among the plurality of categories, using the trained neural network model;
in a case that the probability is identified as 0.5, recognize a category of the object as a second category preferred by a user, based on user preference information; and
modify and refine the trained neural network model based on the recognized category of the object.

5. The neural network training device of claim 4, wherein the at least one processor is further configured to recognize a category of an object included in a second image except for the one of the plurality of second images, using the modified and refined neural network model.

6. The neural network training device of claim 4, wherein the at least one processor is further configured to compare the one of the plurality of second images with an image stored in a previously-generated verification database (DB) to verify a recognition result.

7. A non-transitory computer-readable recording medium having a computer readable program stored therein, wherein the computer readable program, when executed on an electronic device causes the electronic device to:
obtain a plurality of first images and a plurality of second images, wherein each of the plurality of first images includes an object belonging to one of a plurality of categories and each of the plurality of second images includes an object for which a category is not specified,
train a neural network model for category recognition, based on the plurality of first images,
identify probability that the object included in one of the plurality of second images belongs to a first category among the plurality of categories, using the trained neural network model,
in a case that the probability is identified as 0.5, recognize a category of the object as a second category preferred by a user, based on user preference information, and
modify and refine the trained neural network model based on the recognized category of the object.

* * * * *